(12) United States Patent
Nishioka

(10) Patent No.: US 10,671,057 B2
(45) Date of Patent: Jun. 2, 2020

(54) MANAGEMENT SYSTEM

(71) Applicant: FANUC CORPORATION, Yamanashi (JP)

(72) Inventor: Akira Nishioka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 303 days.

(21) Appl. No.: 15/925,840

(22) Filed: Mar. 20, 2018

(65) Prior Publication Data

US 2018/0284734 A1 Oct. 4, 2018

(30) Foreign Application Priority Data

Mar. 29, 2017 (JP) .................. 2017-065869

(51) Int. Cl.
*G06F 11/30* (2006.01)
*G05B 19/418* (2006.01)
(Continued)

(52) U.S. Cl.
CPC ..... *G05B 19/4184* (2013.01); *G05B 19/4065* (2013.01); *G05B 19/4183* (2013.01);
(Continued)

(58) Field of Classification Search
None
See application file for complete search history.

(56) References Cited

U.S. PATENT DOCUMENTS

2017/0314455 A1* 11/2017 Rejeti .............. F01P 11/18

FOREIGN PATENT DOCUMENTS

| JP | H09-085585 A | 3/1997 |
|---|---|---|
| JP | 2003-32764 A | 1/2003 |

(Continued)

OTHER PUBLICATIONS

An Office Action mailed by the Japanese Patent Office dated Jun. 11, 2019, which corresponds to Japanese Patent Application No. 2017-065869 and is related to U.S. Appl. No. 15/925,840.
(Continued)

*Primary Examiner* — Aditya S Bhat
(74) *Attorney, Agent, or Firm* — Studebaker & Brackett PC

(57) ABSTRACT

The present invention has an object of providing a management system capable of predicting a malfunction occurrence rate that takes account of installation conditions and operating conditions of individual machining apparatuses.

A management system that manages machining apparatuses which uses coolant, includes: an acquisition unit that acquires duration information including an installed duration and operating duration of the machining apparatus and condition information based on the installed duration and operating duration of the machining apparatus for each of the machining apparatuses; an analysis unit that analyzes a malfunction occurrence rate for each of the machining apparatuses, based on the duration information and the condition information, as well as the malfunction occurrence information of the machining apparatus caused by coolant; and a notification information generation unit that outputs notification information based on the analyzed malfunction occurrence rate.

5 Claims, 7 Drawing Sheets

(51) Int. Cl.
*G05B 19/4065* (2006.01)
*G05B 23/02* (2006.01)
(52) U.S. Cl.
CPC ....... *G05B 23/027* (2013.01); *G05B 23/0283* (2013.01); *Y02P 90/02* (2015.11)

(56) References Cited

FOREIGN PATENT DOCUMENTS

| | | |
|---|---|---|
| JP | 2003-84824 A | 3/2003 |
| JP | 2007-323148 A | 12/2007 |
| JP | 2009-175793 A | 8/2009 |
| JP | 2009-237714 A | 10/2009 |
| JP | 2009-282822 A | 12/2009 |
| JP | 2014-228983 A | 12/2014 |
| JP | 2015-228069 A | 12/2015 |

OTHER PUBLICATIONS

An Office Action; "Notification of Reasons for Refusal," issued by the Japanese Patent Office dated Jan. 8, 2019, which corresponds to Japanese Patent Application No. 2017-065869 and is related to U.S. Appl. No. 15/925,840 with English Translation.

* cited by examiner

FIG. 6

| LOCATION | ATMOSPHERIC TEMPERATURE | HUMIDITY | ROTATION CONDITION | CORRECTION AMOUNT |
|---|---|---|---|---|
| A | 25°C | 20% | ○ | 0% |
| B | 30°C | 80% | △ | +30% |
| C | 18°C | 30% | ○ | −20% |
| ⋮ | ⋮ | ⋮ | ⋮ | ⋮ |

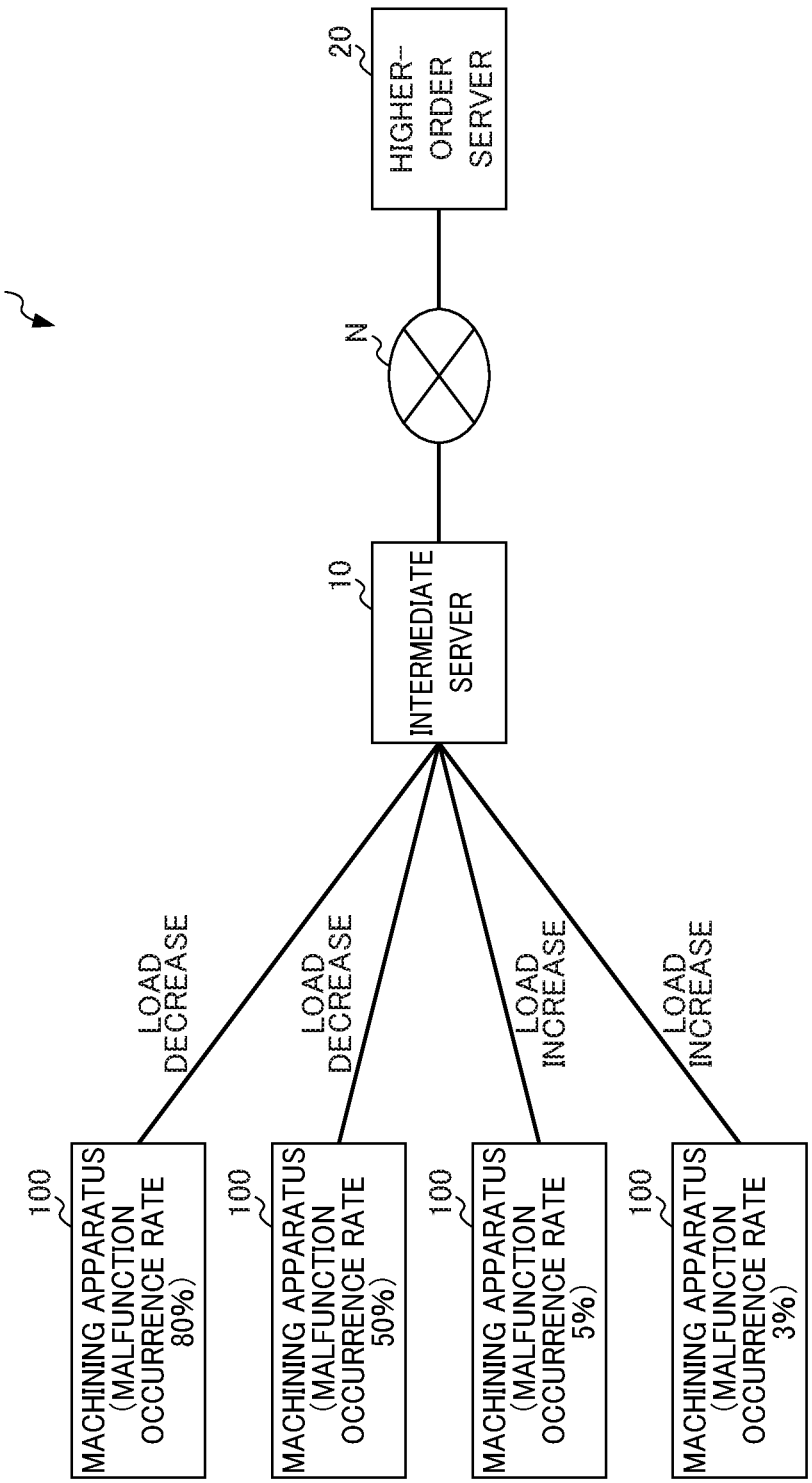

MANAGEMENT SYSTEM

BACKGROUND OF THE INVENTION

This application is based on and claims the benefit of priority from Japanese Patent Application No. 2017-065869, filed on 29 Mar. 2017, the content of which is incorporated herein by reference.

Field of the Invention

The present invention relates to a management system that manages machining devices which use coolant.

Related Art

Conventionally, a machining apparatus that machines a workpiece using cutting fluid or lubricating oil have been known. This machining apparatus includes motors, drive devices, control devices, etc. In a case of printed substrates, resin components used in airtight retaining parts and the like built into the motor, drive device, control device, etc. being employed in environments in which the cutting fluid, lubricating oil, etc. used in machining is falling thereon, there has been a possibility of chemical changes (aging) occurring due to the cutting fluid or lubricating oil, and a malfunction (e.g., deterioration or failure of airtight mechanism or components) occurring in the motor, etc. As a result thereof, the machining apparatus may have stopped and not been able to complete machining of the workpiece for a long time.

In the case of one machining apparatus failing, there is considered a possibility of failure of machining apparatuses of the same type using the same type of cutting fluid or lubricating oil, and countermeasures such as performing maintenance across-the-board on the machining apparatuses of the same type, or maintaining the stopped machining apparatus individually have been taken. In the case of maintaining across-the-board, machining apparatuses for which deterioration has not occurred may be wastefully maintained. In addition, in the case of individually maintaining stopped machines, the countermeasures to other machining apparatuses of the same type for which deterioration is advancing may be delayed.

Therefore, a system has been proposed which shares malfunction information between machining apparatuses using cutting fluid and applies this to other machining apparatuses (e.g., refer to Patent Document 1). In addition, a system has been proposed which accumulates data of the malfunctions of machining apparatuses in a server, and analyzes the data and notifies upon an abnormality occurring (e.g., refer to Patent Document 2). Furthermore, a system has been proposed which detects an abnormality according to a concentration decline in the cutting fluid (e.g., refer to Patent Document 3).

Patent Document 1: Japanese Unexamined Patent Application, Publication No. 2009-282822
Patent Document 2: Japanese Unexamined Patent Application, Publication No. 2009-175793
Patent Document 3: Japanese Unexamined Patent Application, Publication No. H09-85585

SUMMARY OF THE INVENTION

The systems disclosed in Patent Documents 1 to 3 are useful in the point of being able to deal with malfunctions of individual machining apparatuses. On the other hand, these systems have not been able to so much as predict the malfunction occurrence rate taking account of the operating conditions of the individual machining apparatuses.

The present invention has an object of providing a management system capable of predicting a malfunction occurrence rate taking account of the operating conditions of individual machining apparatuses.

A first aspect of the present invention relates to a management system (e.g., the management system 1 described later) that manages machining apparatuses (e.g., the machining apparatus 100 described later) which use coolant, the management system including: a duration information generation unit (e.g., the duration information generation unit 102 described later) that generates duration information including an installed duration and operating duration of the machining apparatus;

a condition information generation unit (e.g., the condition information generation unit 103 described later) that generates condition information based on installation conditions and operating conditions of the machining apparatus;

an acquisition unit (e.g., the acquisition unit 11 described later) that acquires the duration information and the condition information for each of the machining apparatuses;

an analysis unit (e.g., the analysis unit 23 described later) that analyzes a malfunction occurrence rate based on the duration information and the condition information, and malfunction occurrence information of the machining apparatus caused by the coolant; and a notification unit (e.g., the notification unit 104 described later) that outputs notification information based on the malfunction occurrence rate.

According to a second aspect of the present invention, in the management system as described in the first aspect, the analysis unit may include: a calculation part (e.g., the calculation part 231 described later) that calculates a malfunction occurrence rate for each of the machining apparatuses, by comparing between the malfunction occurrence information and the duration information; and a correction part (e.g., the correction part 232 described later) that corrects a malfunction occurrence rate calculated by the calculation part to a malfunction occurrence rate for each of the machining apparatuses, based on the condition information.

According to a third aspect of the present invention, in the management system as described in the second aspect, the correction unit may correct a malfunction occurrence rate using temperature and humidity of an atmosphere surrounding the machining apparatus, based on an installation location of the machining apparatus.

According to a fourth aspect of the present invention, in the management system as described in any one of the first to third aspects, the acquisition unit may acquire the duration information and the condition information from another of the machining apparatuses among the machining apparatuses of the same type, in a case of a malfunction having occurred in any of the machining apparatuses of the same type.

According to a fifth aspect of the present invention, in the management system as described in any one of the first to fourth aspects, the machining apparatus may include a motor, and the condition information may include a rotation condition of the motor.

According to a sixth aspect of the present invention, the management system as described in any one of the first to fifth aspects may further include an allocation unit (e.g., the allocation unit 15 described later) that allocates an overall load amount of a plurality of the machining apparatuses to each of the machining apparatuses based on the malfunction occurrence rate.

According to the present invention, it is possible to provide a management system capable of predicting a malfunction occurrence rate taking account of operating conditions of individual machining apparatuses.

BRIEF DESCRIPTION OF THE DRAWINGS

FIG. 6 is a conceptual table showing correction information of the management system in the first embodiment;

FIG. 10 is a conceptual diagram showing the allocation of load in the management system of the second embodiment.

DETAILED DESCRIPTION OF THE INVENTION

Hereinafter, a management system 1 according to the respective embodiments of the present invention will be explained by referencing FIGS. 1 to 8. First, a machining apparatus 100 which is managed in the management system 1 according to the first embodiment will be explained.

The machining apparatus 100, for example, is a machine tool such as a lathe or machining center, and includes motors, devices for driving and controlling it, etc. The machining apparatus 100 machines a workpiece using coolant such as cutting fluid, lubricating oil, and liquid coolant.

A plurality of the machining apparatuses 100 is installed within a factory that machines workpieces, for example. Each of the machining apparatuses 100 is installed at a different location within the factory, and operates under a different environment (e.g., atmospheres). Each of the machining apparatuses 100 thereby operates under different atmospheric temperature and humidity, for example. In addition, the machining apparatus 100 becomes able to machine a workpiece at a load (e.g., workload) depending on a set load amount.

Accompanying machining of a workpiece, the coolant may adhere to a printed substrate, resin components, etc. built into the motor, drive device or control device of the machining apparatus 100. In the machining apparatus 100, insulation breakdown of the motor and corrosion at the printed substrate may occur due to a chemical change with the adhered coolant. In addition, when malfunction caused by the coolant starts to occur in components which influence the movement of the motor such as the bearings of the motor, the influence is expressed in the torque, positioning error, etc. For this reason, the malfunction occurrence rate caused by the coolant of the machining apparatus 100 will rise as the operating duration of the machining apparatus 100 lengthens.

On the other hand, the extent of chemical change due to coolant varies according to the operating conditions of the machining apparatus 100, even if the same operating duration. The extent of chemical change due to coolant, for example, varies depending on the temperature and humidity of the surroundings of the machining apparatus 100. In particular, the extent of chemical change due to coolant is greater with higher temperature of the surroundings of the machining apparatus 100, and is greater with higher humidity. For this reason, the malfunction occurrence rate of the machining apparatus 100 caused by coolant differs according to the operating conditions in machining apparatuses 100 of the same type using the same type of coolant, even if the same operating duration.

It should be noted that same type of coolant refers to coolant having the same or similar chemical properties (e.g., model number difference, difference in manufacturer, etc.). In addition, machining apparatus 100 of the same type refers to machining apparatuses 100 which can do the same machining or similar machining on a workpiece.

First Embodiment

Figure 1:
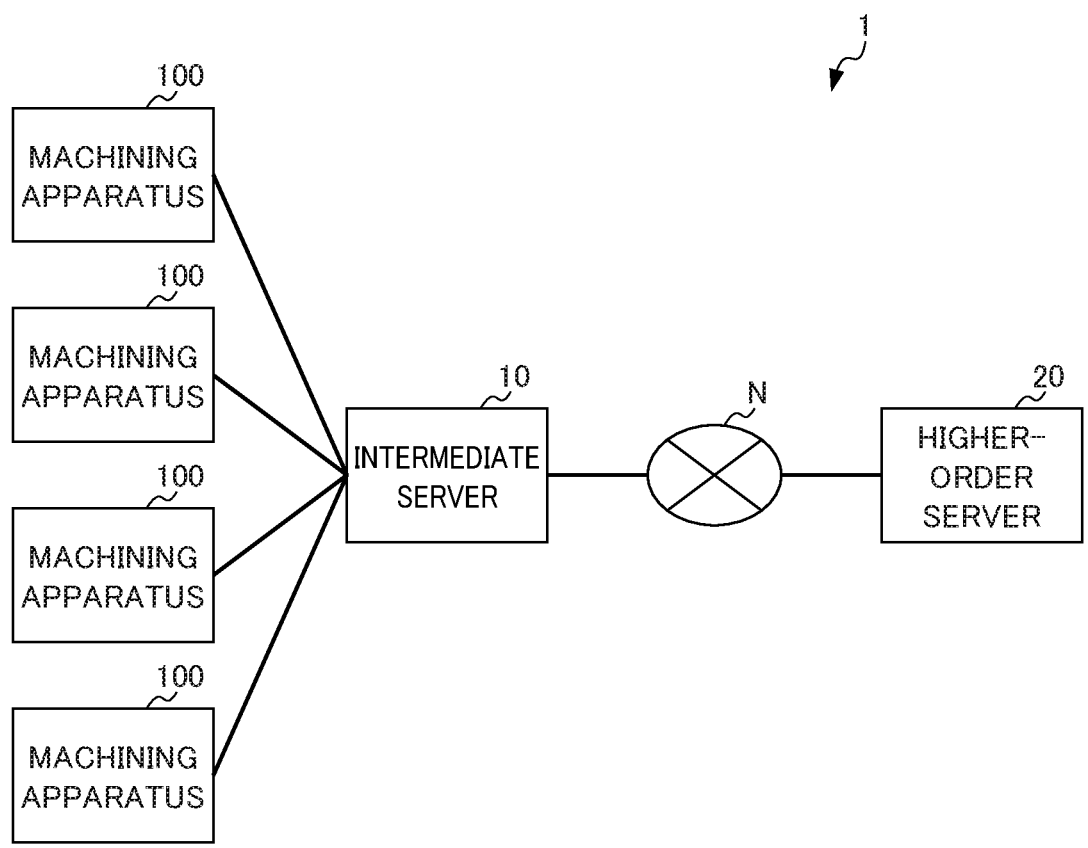
FIG. 1 is a schematic block diagram showing a management system according to a first embodiment of the present invention.

Next, a management system 1 according to a first embodiment of the present invention will be explained by referencing FIGS. 1 to 7. The management system 1 according to the present embodiment is a system which manages the machining apparatuses 100 for every machining apparatus 100 of the same type using the same type of coolant. The management system 1 is a system that predicts the malfunction occurrence rate for every machining apparatus 100 using coolant, and manages the machining apparatuses 100 based on the predicted malfunction occurrence rate. More specifically, the management system 1 is a system that outputs notification information that notifies of the event of the malfunction occurrence rate being high to a machining apparatus 100 determined as having a high malfunction occurrence rate. The management system 1 includes the machining apparatuses 100, intermediate server 10, and higher-order server 20, as shown in FIG. 1.

Figure 2:
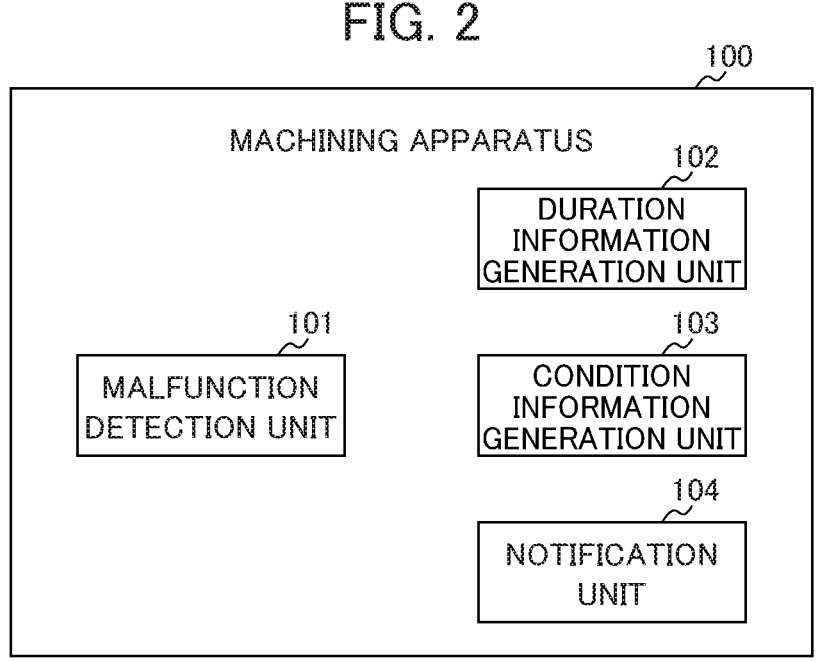
FIG. 2 is a block diagram showing the configuration of a machining apparatus of the management system in the first embodiment.

The machining apparatus 100 is communicably connected to the intermediate server 10 via a network. The machining apparatus 100 includes a malfunction detection unit 101, duration information generation unit 102, condition information generation unit 103, and notification unit 104, as shown in FIG. 2.

The malfunction detection unit 101 detects whether a malfunction is occurring in operation of the machining apparatus 100. The malfunction detection unit 101, in the case of detecting the occurrence of a malfunction, sends information indicating the event of a malfunction occurring to the duration information generation unit 102 and condition information generation unit 103.

The duration information generation unit 102 generates duration information, in the case of receiving information indicating the event of a malfunction occurring from the malfunction detection unit 101. More specifically, the duration information generation unit 102 generates duration information including the operating duration that has elapsed since installation of a machining apparatus 100. The duration information generation unit 102 sends the generated duration information to the intermediate server 10.

The condition information generation unit 103 generates condition information in the case of receiving information indicating the event of a malfunction occurring from the malfunction detection unit 101. The condition information generation unit 103 generates condition information based on the operating conditions of the machining apparatus 100. More specifically, the condition information generation unit 103, for example, generates condition information including the installation location within the factory, revolution speed and torque of a motor, malfunction occurrence condition, type of coolant being used, etc. The condition information generation unit 103 sends the generated condition information to the intermediate server 10.

The notification unit 104, for example, is a display device or sound device, and is a device that outputs information by way or display and/or light emission, sound, etc. The notification unit 104 outputs information using display and/or light emission, sound, etc., based on the information sent from the intermediate server 10. The notification unit 104 outputs notification information generated by a notification information generation unit 14 described later.

Figure 3:
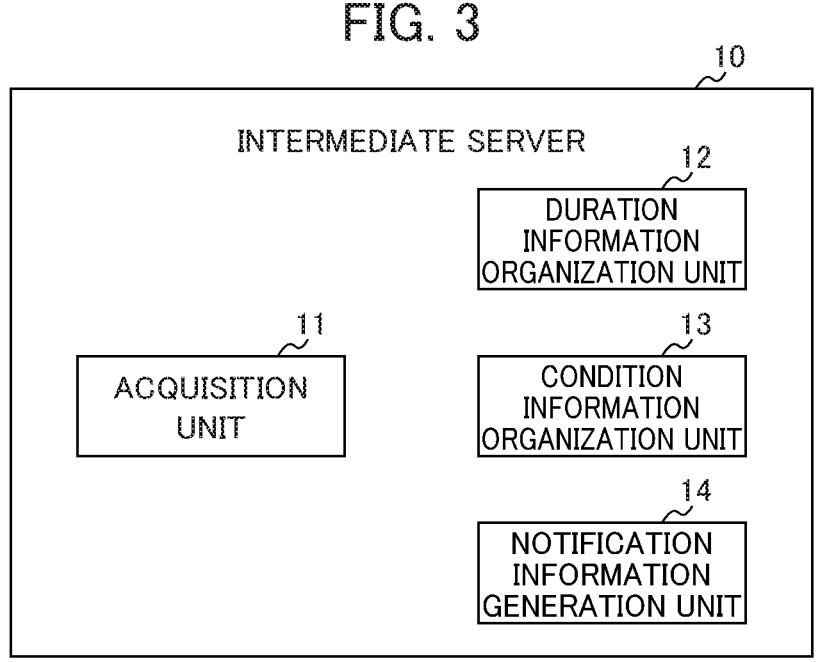
FIG. 3 is a block diagram showing the configuration of an intermediate server of the management system in the first embodiment.

The intermediate server 10 is an edge server of fog computing, for example. The intermediate server 10 is connected to the higher-order server 20 via the Internet N. The intermediate server 10 organizes the duration information, condition information and identification information sent from the plurality of machining apparatuses 100. The intermediate server 10 sends the organized information to the higher-order server 20. In addition, the intermediate server 10 sends information based on the malfunction occurrence rate of every machining apparatus 100 sent from the higher-order server 20 to the machining apparatus 100. It should be noted that to "organize" indicates to consolidate the various information sent from the plurality of machining apparatuses 100 as one set of information. The intermediate server 10 includes an acquisition unit 11, duration information organization unit 12, condition information organization unit 13, and notification information generation unit 14, as shown in FIG. 3.

The acquisition unit 11, for example, acquires the duration information including operating duration of the machining apparatus 100 and condition information based on the operating conditions of the machining apparatus 100, in every machining apparatus 100. In addition, the acquisition unit 11 acquires identification information from each of the plurality of machining apparatuses 100. The acquisition unit 11 sends the acquired duration information and identification information to the duration information organization unit 12. In addition, the acquisition unit 11 sends the acquired condition information and identification information to the condition information organization unit 13.

The duration information organization unit 12 organizes the duration information and identification information sent from each of the plurality of machining apparatuses 100. The duration information organization unit 12 sends the organized duration information and identification information to the higher-order server 20.

The condition information organization unit 13 organizes the condition information and identification information from each of the plurality of machining apparatuses 100. The condition information organization unit 13 sends the organized condition information and identification information to the higher-order server 20.

The notification information generation unit 14 acquires information indicating the malfunction occurrence rate for every machining apparatus 100 analyzed by the higher-order server 20. The notification information generation unit 14, in the case of the analyzed malfunction occurrence rate exceeding a predetermined threshold value, generates notification information related to the corresponding machining apparatus 100. The notification information generation unit 14 sends the generated notification information to the notification unit 104 of the corresponding machining apparatus 100.

Figure 4:
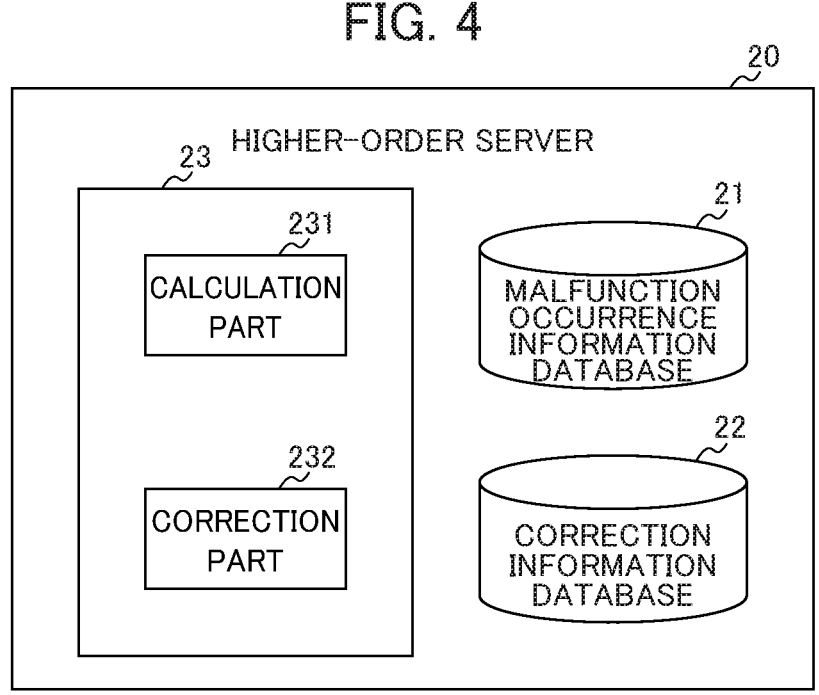
FIG. 4 is a block diagram showing the configuration of a higher-order server of the management system in the first embodiment.
Figure 5:
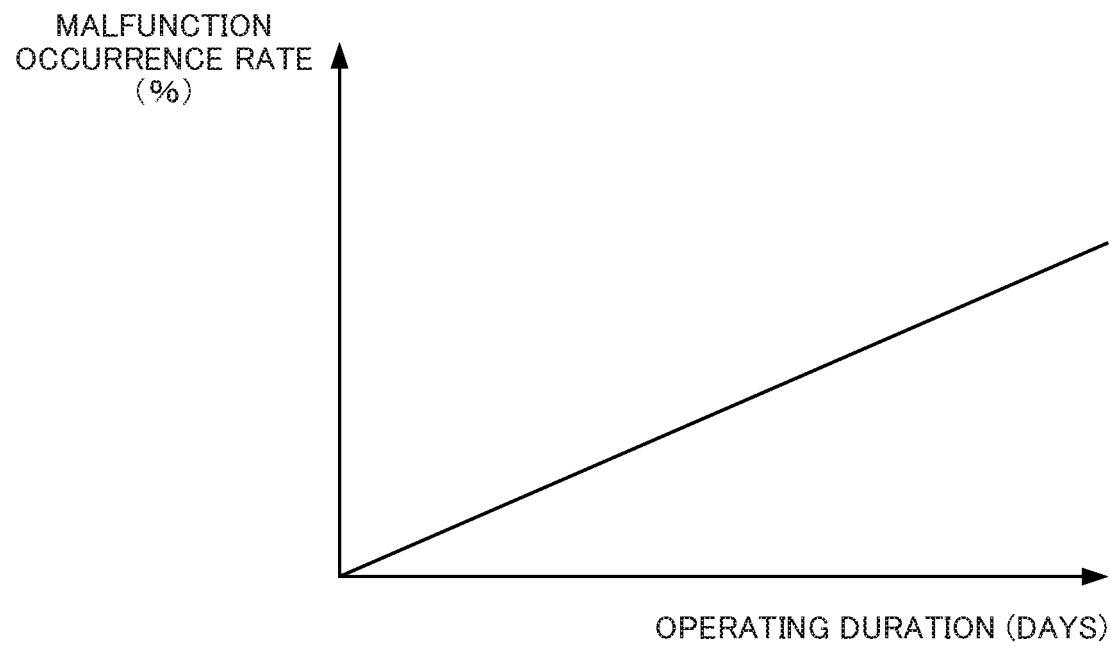
FIG. 5 is a conceptual graph showing malfunction occurrence information of the management system in the first embodiment.

The higher-order server 20 is a cloud server, for example. The higher-order server 20 analyzes the malfunction occurrence rate for every machining apparatus 100, based on the duration information and condition information organized and sent by the intermediate server 10. In addition, the higher-order server 20 sends the analyzed malfunction occurrence rate to the intermediate server 10. The higher-order server 20 includes a malfunction occurrence information database 21, correction information database 22, and analysis unit 23, as shown in FIG. 4.

The malfunction occurrence information database 21 stores the malfunction occurrence information indicating the malfunction occurrence rate of the machining apparatus 100 caused by coolant. More specifically, the malfunction occurrence information database 21 stores the malfunction occurrence information indicating the interrelation between the operating duration of the machining apparatus 100 and the occurrence rate of malfunctions caused by aging of components due to coolant. The malfunction information database 21 stores the malfunction occurrence information indicating the interrelation between the operating duration and malfunction occurrence rate such as that shown in FIG. 5, for example.

The correction information database 22 stores, as correction information, the correction amounts for the malfunction occurrence rate according to the operating conditions of the machining apparatus 100. The correction information database 22 stores, as the correct information, the correction amounts for the malfunction occurrence rate according to various information included in the condition information such as that shown in FIG. 6, for example.

The analysis unit 23 analyzes the malfunction occurrence rate for every machining apparatus 100, based on the duration information and condition information, as well as the malfunction occurrence information indicating the malfunction occurrence rate of the machining apparatus 100 caused by coolant. The analysis unit 23 includes a calculation part 231 and a correction part 232.

The calculation part 231, for example, calculates the malfunction occurrence rate for every machining apparatus 100, by comparing the malfunction occurrence information indicating the malfunction occurrence rate based on the operating duration, with the duration information. More specifically, the calculation part 231 reads out the malfunction occurrence information from the malfunction occurrence information database 21, and compares with the duration information sent from the intermediate server 10. The calculation part 231, as a result of comparing, calculates the malfunction occurrence rate for each of the plurality of machining apparatuses 100 identified according to the identification information. The calculation part 231 sends the calculated malfunction occurrence rate to the correction part 232. Hereinafter, when it is necessary to distinguish, the malfunction occurrence rate calculated by the calculation part 231 will be described as "pre-correction malfunction occurrence rate".

The correction part 232 corrects the pre-correction malfunction occurrence rate calculated by the calculation part 231 based on the condition information, thereby correcting to the malfunction occurrence rate for every machining apparatus 100. More specifically, the correction part 232 reads out the correction information from the correction information database 22. The correction part 232 compares the correction information with the condition information sent from the intermediate server 10. The correction part 232, as a result of comparing, determines the correction amount of the pre-correction malfunction occurrence rate, for each of the plurality of machining apparatuses 100 identified according to the identification information. The correction part 232 corrects the pre-correction malfunction occurrence rate using the determined correction amount. The correction part 232 sends the corrected malfunction occurrence rate to the notification information generation unit 14 and an allocation unit. Hereinafter, when it is necessary to distinguish, the malfunction occurrence rate corrected by the correction part 232 will be described as "post-correction malfunction occurrence rate".

Figure 7:
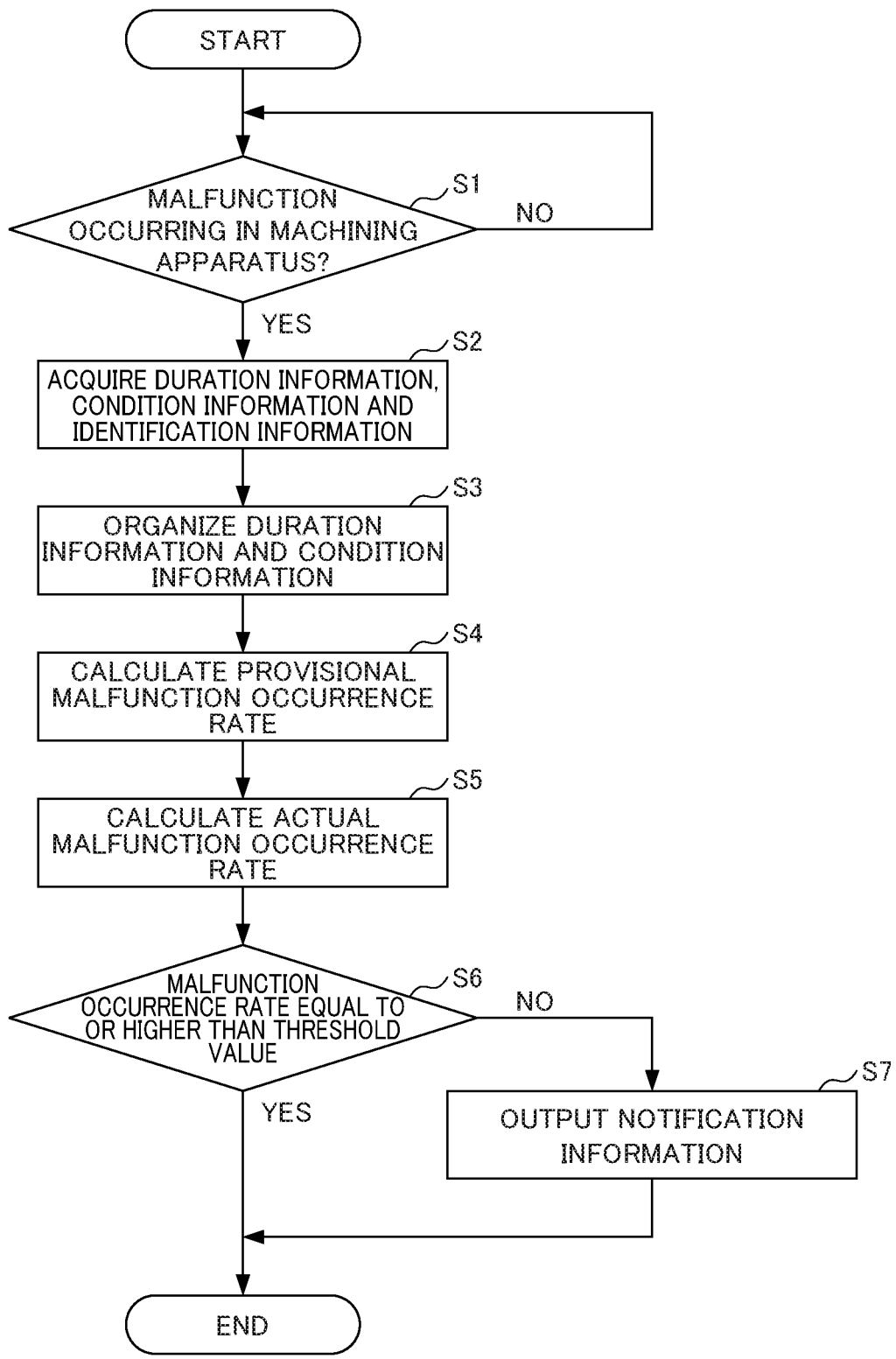
FIG. 7 is a flowchart showing the processing of the management system in the first embodiment.

Next, the processing for management of the machining apparatuses 100 by the management system 1 will be explained by referencing the flowchart of FIG. 7. First, in Step S1, the malfunction detection part 101 of each of the plurality of machining apparatuses 100 detects whether or not a malfunction has occurred in any of the machining apparatuses 100. In the case of malfunction having occurred (Step S1: YES), the processing advances to Step S2. On the other hand, in the case of malfunction not occurring (Step S1: NO), the processing repeats Step S1.

In Step S2, the duration information, condition information and identification information is sent from the machining apparatus 100 in which a malfunction has occurred to the intermediate server 10. More specifically, the malfunction detection part 101, if detecting a malfunction of the machining apparatus 100, sends information produced by detecting the malfunction to the duration information generation part 102 and condition information generation part 103. The duration information generation part 102 generates duration information and sends to the intermediate server 10. In addition, at least one among the duration information generation part 102 and condition information generation part 103 generates identification information for identifying the machining apparatus 100, and sends to the intermediate server 10.

The condition information generation part 103 generates the condition information, and sends to the intermediate server 10. The acquisition unit 11 requests the sending of duration information, condition information and identification information to the machining apparatus 10 for which malfunction has occurred. Each of the plurality of machining apparatuses 100 generates the duration information, condition information and identification information in response to the request, and sends to the intermediate server 10. The acquisition unit 11 acquires the duration information, condition information and identification information from each of the plurality of machining apparatuses 100. In addition, the acquisition unit 11 acquires the duration information, condition information and identification information from the machining apparatuses 100 which are the same type using the same type of coolant as the machining apparatus 100 in which a malfunction occurred.

In Step S3, the duration information organization unit 12 organizes the duration information and identification information sent from the plurality of machining apparatuses 100, and sends to the calculation part 231 of the higher-order server 20. In addition, the condition information organization unit 13 organizes the condition information and identification information sent from the plurality of machining apparatuses 100, and sends to the correction part 232 of the higher-order server 20.

In Step S4, the calculation part 231 calculates the pre-correction malfunction correction rate, by comparing the operating duration included in the duration information, with the malfunction occurrence information indicating the correlation between the operating duration and malfunction occurrence rate, for every machining apparatus 100 identified according to the identification information. The calculation part 231 sends the calculated pre-correction malfunction occurrence rate along with the identification information to the correction part 232.

In Step S5, the correction part 232 extracts correction information that matches or is similar to the operating conditions of the machining apparatus 100 included in the condition information. The correction part 232 corrects the pre-correction malfunction occurrence rate to the post-correction malfunction occurrence rate, using the correction amount included in the extracted correction information. The correction part 232, for example, extracts correction information indicating conditions for which the temperature and/or humidity of the location at which the machining apparatus 100 is installed are matching or similar, and corrects the pre-correction malfunction occurrence rate to the post-correction malfunction occurrence rate with the correction amount included in the extracted correction information. In addition, the correction part 232, for example, extracts correction information indicating conditions that are matching or similar to the motor rotation condition of the machining apparatus 100, and corrects the pre-correction malfunction occurrence rate to the post-correction malfunction occurrence rate with the correction amount included in the extracted correction information. The correction part 232 sends the post-correction malfunction occurrence rate to the notification information generation unit 14 of the intermediate server 10, along with the identification information.

In Step S6, the notification information generation unit 14 judges whether or not the post-correction malfunction occurrence rate is exceeding a predetermined threshold value, for every machining apparatus 100 identified according to the identification information. The notification information generation unit 14, in the case of the post-correction malfunction occurrence rate exceeding the predetermined threshold value as a result of judgment (Step S6: YES), generates and sends notification information to the machining apparatus 100 identified according to the identification information. Then, in Step S7, the notification part 104 having acquired the notification information outputs the acquired notification information. Then, operation of the management system 1 ends.

On the other hand, the notification information generation unit 14, in the case of the post-correction malfunction occurrence rate of the machining apparatus 100 identified according to the identification information not exceeding the predetermined threshold value as a result of judgment (Step S6: NO), does not output the notification information to the machining apparatus 100 identified according to the identification information. Then, operation of the management system 1 ends.

According to the management system 1 related to the above first embodiment of the present invention, the following such effects are exerted.

(1) The management system 1 includes: the duration information generation part 102 that generates duration information including the installed duration and operating duration of the machining apparatus 100; the condition information generation part 103 that generates condition information based on the installation conditions and/or operating conditions of the machining apparatus 100; the acquisition unit 11 that acquires duration information and condition information for every machining apparatus 100; the analysis unit 23 that analyzes the malfunction occurrence rate based on the duration information and condition information, as well as the malfunction occurrence information of the machining apparatus 100 caused by coolant; and the notification information generation unit 14 that outputs notification information based on the malfunction occurrence rate. Since the malfunction occurrence rate is analyzed using the duration information and condition information as well as the malfunction occurrence information, it is possible to analyze the malfunction occurrence rate according to not only the installed duration and operating duration of the machining apparatus 100, but also the installation conditions and operating conditions of the machining apparatus 100. It is thereby possible to improve the prediction accuracy of the malfunction occurrence rate of the machining apparatuses 100, compared to a case of analyzing the malfunction occurrence rate equally based on only the duration information. In addition, by outputting the notification information in the case of the malfunction occurrence rate exceeding the predetermined threshold value, early-stage handling of cases where malfunction has occurred in the machining apparatus 100 at which notification information was outputted becomes possible. In addition, it is possible to cut down on wasteful across-the-board maintaining of machining apparatuses 100 using the same type of coolant.

(2) The analysis unit 23 includes the calculation part 231 that compares the malfunction occurrence information and duration information, and then calculates the malfunction occurrence rate for every machining apparatus 100; and the correction part 232 that corrects the malfunction occurrence rate calculated by the calculation part 231 based on the condition information to the malfunction occurrence rate for every machining apparatus 100. It is thereby possible to correct the malfunction occurrence rate using the differences in malfunction occurrence rates caused by coolant, based on the installation conditions and operating conditions of the machining apparatus 100. It is thereby possible to specifically determine the malfunction occurrence rate predicted for every machining apparatus 100.

(3) The correction part 232 corrects the malfunction occurrence rate using the temperature and humidity of the environment surrounding the machining apparatus 100, based on the installation location of the machining apparatus 100. It is possible to correct the malfunction occurrence rate taking account of the influence of chemical changes due to coolant, by using the temperature and humidity of the environment surrounding the machining apparatus 100. Therefore, it is possible to further improve the prediction accuracy of the malfunction occurrence rate for every machining apparatus 100.

(4) The acquisition unit 11 acquires duration information and condition information from another of the machining apparatuses 100 among the machining apparatuses 100 of the same type, in the case of a malfunction having occurred in any among the same type of machining apparatuses 100. It is thereby possible to acquire duration information and condition information of another machining apparatus 100 of the same type, and analyze the malfunction occurrence rate of machining apparatuses 100 of the same type which are closer to the malfunction occurrence time, with the malfunction trigger occurring in any of the machining apparatuses 100 of the same type. Therefore, it is possible to output notification information based on the malfunction occurrence rate conforming to the present condition.

Second Embodiment

Figure 8:
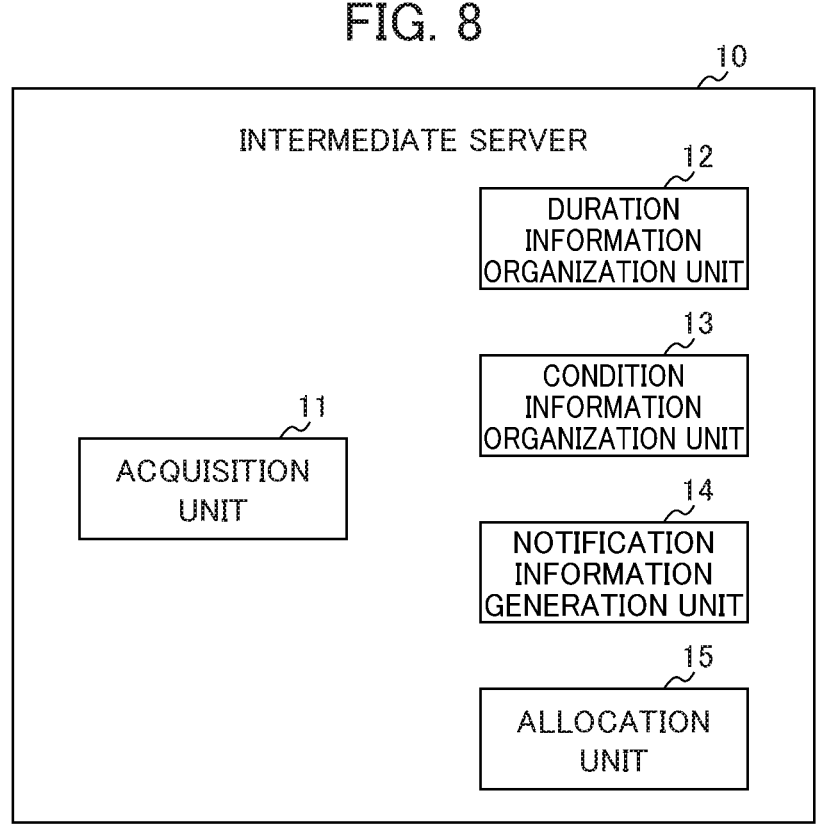
FIG. 8 is a block diagram showing the configuration of an intermediate server in a management system of a second embodiment.
Figure 9:
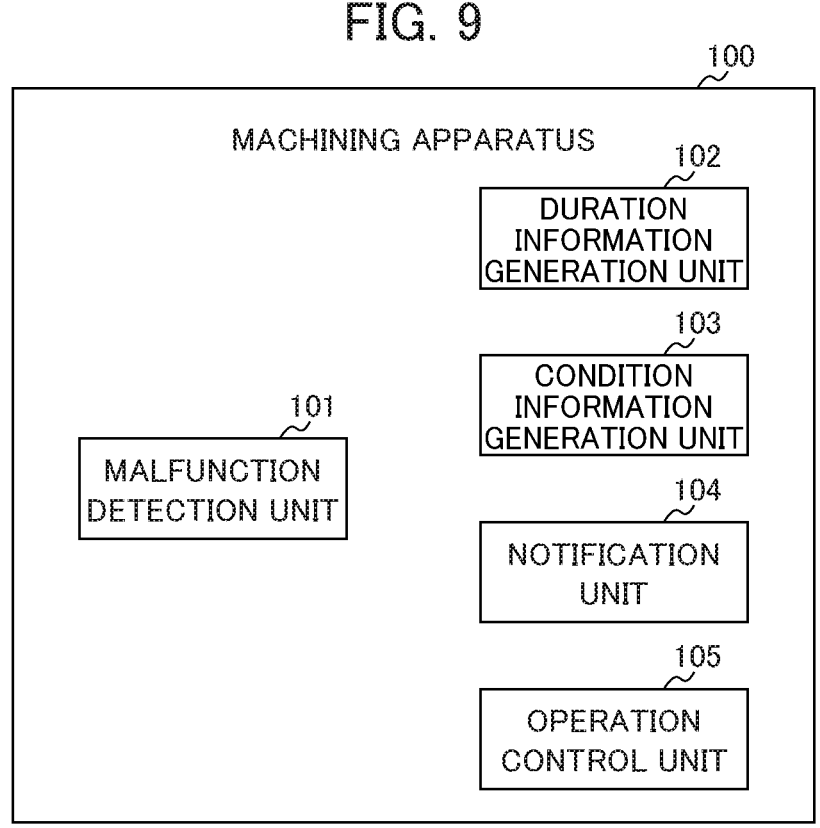
FIG. 9 is a block diagram showing the configuration of a machining apparatus of the management system in the second embodiment.

Next, a management system 1 according to a second embodiment of the present invention will be explained by referencing FIGS. 8 to 10. Upon explanation of the second embodiment, the same reference symbols will be attached for identical constituent elements, and explanation thereof will be omitted or simplified. In the management system 1 according to the second embodiment, the intermediate server 10 further includes an allocation unit 15, as shown in FIG. 8. In addition, in the management system 1 according to the second embodiment, the machining apparatus 100 includes an operation control part 105, as shown in FIG. 9.

The allocation unit 15 acquires post-correction malfunction generation rates for each of the machining apparatuses 100 from the correction parts 232. The allocation unit 15 allocates the overall load amount of machining apparatuses 100 of the same type to each of the machining apparatuses 100. The allocation unit 15 allocates in order of higher loads from a machining apparatuses 100 having a low post-correction malfunction occurrence rate.

The allocation unit 15, for example, decreases the load for the machining apparatuses 100 established with a post-correction malfunction occurrence rate of 80% and 50%, as shown in FIG. 10. In addition, the allocation unit 15 increases the load for the machining apparatuses 100 established with a post-correction malfunction occurrence rate of 3% and 5%. The allocation unit 15 allocates the decreased amount in load for machining apparatuses 100 having high post-correction malfunction occurrence rate as an increased amount in load for machining apparatuses 100 having low post-correction malfunction occurrence rate. The allocation unit 15 generates load information indicating the load amount for every machining apparatus 100. The allocation unit 15 sends the generated load information to each of the machining apparatuses 100.

The operation control part 105 controls operation of the machining apparatus 100 based on the sent load information. The operation control part 105 controls the number of machining processes of the machining apparatus 100, for example. The operation control part 105 controls the operation time, friction load, etc. of the machining apparatus 100, for example, as the number of machining processes.

According to the management system 1 related to the above second embodiment of the present invention, the following such effects are exerted.

(5) The management system 1 further includes the allocation unit 15 which allocates the overall load amount of the plurality of machining apparatuses 100 to each of the machining apparatuses 100 based on the malfunction occurrence rate. Since it is possible to allocate the overall load amount to the machining apparatuses 100 according to the malfunction occurrence rates, the load of machining apparatuses 100 having high malfunction occurrence rate can be decreased without reducing the overall load. Therefore, it is possible to gain time for preparation until the maintenance of a machining apparatus 100 having high malfunction occurrence rate.

Although the respective preferred embodiments of the management system of the present invention have been explained above, the present invention is not to be limited to the aforementioned embodiments, and modifications are possible where appropriate.

In the above-mentioned embodiments, in the case of a malfunction occurring in any of the machining apparatuses 100, the acquisition unit 11 is configured to acquire duration information and condition information from each of the machining apparatuses 100 which are of the same type using the same type of coolant; however, it is not limited thereto. For example, the acquisition unit 11 may periodically acquire duration information and condition information from each of the machining apparatuses 100 of the same type using the same type of coolant. Since it is thereby possible to always grasp a machining apparatus 100 having high malfunction occurrence rate, it is possible to make maintenance and inspection of the machining apparatuses 100 prior to malfunction occurrence.

In addition, in the above-mentioned embodiments, the acquisition unit 11 is configured to acquire identification information from the machining apparatus 100; however, it is not limited thereto. For example, the acquisition unit 11 can acquire identification information of the machining apparatuses 100 by identifying the port number or the like of the machining apparatuses 100 connected to the intermediate server 10.

In addition, in the above-mentioned embodiment, the analysis unit 23 may further include an update unit (not illustrated) which updates other correction information stored in the correction information database 22, in the case of a malfunction occurrence condition being further included in the condition information sent from the machining apparatus 100. The update unit acquires the pre-correction malfunction occurrence rate calculated by the calculation part 231, for a machining apparatus 100 for which malfunction has occurred. The update unit defines the difference between the pre-correction malfunction occurrence rate and 100% as the correction amount, and generates correction information associating the correction amount to the condition information of the machining apparatus 100 for which malfunction has occurred. The update unit stores the generated correction information in the correction information database 22 as new correction information.

It is thereby possible to accumulate correction information related to examples where malfunction occurred after correction. Therefore, it is possible to further improve the accuracy of correcting to the post-correction malfunction occurrence rate.

In addition, in the above-mentioned embodiments, the correction information database 22 is configured to store the correction information indicating the correction amount for the malfunction occurrence rate. In addition, the correction part 232 is configured to calculate the post-correction malfunction occurrence rate by correcting the pre-correction malfunction occurrence rate. In place of this, the correction information database 22 may store the correction information for correcting the operating duration.

In addition, the correction part 232 may correct the operating duration included in the duration information based on the correction information. The calculation part 231 may calculate the post-correction malfunction occurrence rate, based on the corrected operating duration.

In addition, in the above-mentioned embodiments, the correction information database 22 may store malfunction occurrence information for every type of coolant. The acquisition unit 11 may acquire the duration information, operating information and identification information from each of various machining apparatuses 100 using various coolants. Then, the duration information organization unit 12 may organize the duration information and identification information for every machining apparatus 100 of the same type using the same type of coolant. In addition, the condition information organization unit 13 may organize the condition information and identification information for every machining apparatus 100 of the same type using the same type of coolant.

The entirety or parts of the various servers included in the present invention can be realized by hardware, software or a combination of these. Herein, being realized by software indicates the matter of being realized by a computer reading out and executing programs. In the case of constituting by hardware, a part or the entirety of the servers can be configured by integrated circuits (IC) such as LSI (Large Scale Integrated circuit), ASIC (Application Specific Integrated Circuit), gate array and FPGA (Field Programmable Gate Array), for example.

In the case of constituting the entirety or parts of the functions equipped to the various servers included in the present invention by software, it is possible to realize by storing the information required in computation in DRAM of a computer configured by a storage unit such as a hard disk and ROM storing programs coding the entirety or parts of the operations of the various servers included in the present invention, the DRAM storing the data required in computation, a CPU, and a bus connecting the respective parts, and causing these programs to be run by the CPU.

In addition, it may be made a configuration that executes the respective functions equipped to various servers included in the present invention on one or a plurality of servers as appropriate. In addition, it may realize the respective functions equipped to the various servers included in the present invention by employing virtual server function or the like on a cloud.

The programs can be stored using various types of computer readable media, and supplied to a computer. The computer readable media includes various types of tangible storage media. Examples of computer readable media include magnetic media (for example, flexible disks, magnetic tape, hard disk drive), magneto-optical recording media (for example, magneto-optical disk), CD-ROM (Read Only Memory), CD-R, CD-R/W, and semiconductor memory (for example, mask ROM, PROM (Programmable ROM), EPROM (Erasable PROM), flash ROM, RAM (random access memory)).

EXPLANATION OF REFERENCE NUMERALS 1 management system
11 acquisition unit
15 allocation unit
23 analysis unit
100 machining apparatus
102 duration information generation unit
103 condition information generation unit
104 notification unit
231 calculation part
232 correction part

What is claimed is:

1. A management system that manages machining apparatuses which use coolant, the management system comprising:
a duration information generation unit that generates duration information including at least one of an installed duration and operating duration of the machining apparatus;

a condition information generation unit that generates condition information based on at least one of installation conditions and operating conditions of the machining apparatus;

an acquisition unit that acquires the duration information and the condition information for each of the machining apparatuses;

an analysis unit including:
  a calculation part that calculates a malfunction occurrence rate for each of the machining apparatuses, by comparing between malfunction occurrence information of the machining apparatus caused by the coolant and the duration information;
  a correction part that acquires correction information indicating a correction amount according to an operation conditions of the machining apparatus, that determines an correction amount based on the condition information and the correction information, and that corrects a malfunction occurrence rate calculated by the calculation part to a malfunction occurrence rate by using the determined correction amount; and
  an update unit that updates the acquired correction information;

a notification unit that outputs notification information based on the malfunction occurrence rate; and an allocation unit that allocates an overall load amount of a plurality of the machining apparatuses to each of the machining apparatuses as higher loads to the machining apparatuses having a low post-correction malfunction occurrence rate; wherein the update unit updates the correction information by adding an correction amount depending on a malfunction occurrence condition to the malfunction occurrence rate calculated by the calculation part, in case of, in the case of a malfunction occurrence condition being included in the condition information the correction part acquires the updated correction information.

2. The management system according to claim 1, wherein the correction part corrects a malfunction occurrence rate using temperature and humidity of an atmosphere surrounding the machining apparatus, based on an installation location of the machining apparatus.

3. The management system according to claim 1, wherein the acquisition unit acquires the duration information and the condition information from another of the machining apparatuses among the machining apparatuses of the same type, in a case of a malfunction having occurred in any of the machining apparatuses of the same type.

4. The management system according to claim 1,
wherein the machining apparatus includes a motor, and
wherein the condition information includes a rotation condition of the motor.

5. The management system according to claim 1, wherein the allocation unit that allocates the decreased amount in load for machining apparatuses having high post-correction malfunction occurrence rate as an increased amount in load for machining apparatuses having low post-correction malfunction occurrence rate.

* * * * *